(12) United States Patent
Pucher et al.

(10) Patent No.: US 9,938,607 B2
(45) Date of Patent: Apr. 10, 2018

(54) METALLIC COMPOSITE MATERIAL FOR A SLIDING BEARING COMPRISING A METALLIC SUPPORT LAYER

(71) Applicant: KS Gleitlager GmbH, St. Leon-Rot (DE)

(72) Inventors: Klaus Pucher, Augsburg (DE); Werner Schubert, Wiesloch (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 311 days.

(21) Appl. No.: 14/761,313

(22) PCT Filed: Jan. 23, 2014

(86) PCT No.: PCT/EP2014/051280
§ 371 (c)(1),
(2) Date: Jul. 16, 2015

(87) PCT Pub. No.: WO2014/118067
PCT Pub. Date: Aug. 7, 2014

(65) Prior Publication Data
US 2015/0345558 A1 Dec. 3, 2015

(30) Foreign Application Priority Data
Feb. 1, 2013 (DE) .......... 10 2013 201 720

(51) Int. Cl.
| | | |
|---|---|---|
| *B32B 15/00* | (2006.01) | |
| *C22C 9/02* | (2006.01) | |
| *F16C 9/04* | (2006.01) | |
| *B32B 15/01* | (2006.01) | |
| *C23C 24/08* | (2006.01) | |
| *C23C 28/00* | (2006.01) | |
| *C23C 28/02* | (2006.01) | |
| *F16C 33/12* | (2006.01) | |

(Continued)

(52) U.S. Cl.
CPC ............. *C22C 9/02* (2013.01); *B32B 15/01* (2013.01); *C23C 24/087* (2013.01); *C23C 28/00* (2013.01); *C23C 28/021* (2013.01); *F16C 9/04* (2013.01); *F16C 33/121* (2013.01); *F16C 33/125* (2013.01); *C22C 13/00* (2013.01); *C22C 21/003* (2013.01); *F16C 2204/12* (2013.01); *Y10T 428/12042* (2015.01); *Y10T 428/12063* (2015.01); *Y10T 428/12924* (2015.01)

(58) Field of Classification Search
None
See application file for complete search history.

(56) References Cited

U.S. PATENT DOCUMENTS

| | | | | |
|---|---|---|---|---|
| 6,905,779 B2 * | 6/2005 | Sakai | .......... | B22F 1/0003 384/910 |
| 7,263,913 B2 * | 9/2007 | Rubel | .......... | F16C 9/04 74/579 R |

(Continued)

*Primary Examiner* — Daniel J Schleis
(74) *Attorney, Agent, or Firm* — Paul Vincent

(57) ABSTRACT

A metallic composite material for a sliding bearing (2) has a metallic support layer (4), in particular steel, and a bearing metal layer (6) based on copper-tin with 2-6 wt. % tin. The bearing metal layer (6) has 0.2-2 wt. % nickel. A sliding bearing element, which is to be used in or close to the motor, can be produced from this type of sliding bearing composite material (2).

15 Claims, 3 Drawing Sheets

(51) Int. Cl.
　　　*C22C 13/00*　　　(2006.01)
　　　*C22C 21/00*　　　(2006.01)

(56) References Cited

U.S. PATENT DOCUMENTS

2003/0196736 A1* 10/2003 Miyafuji ................ C22C 9/02
　　　　　　　　　　　　　　　　　　　　　　　148/684
2004/0048094 A1　　3/2004　Rubel
2004/0161625 A1　　8/2004　Sakal
2007/0254180 A1　11/2007　Ababnoh
2013/0051715 A1　　2/2013　Zidar

* cited by examiner

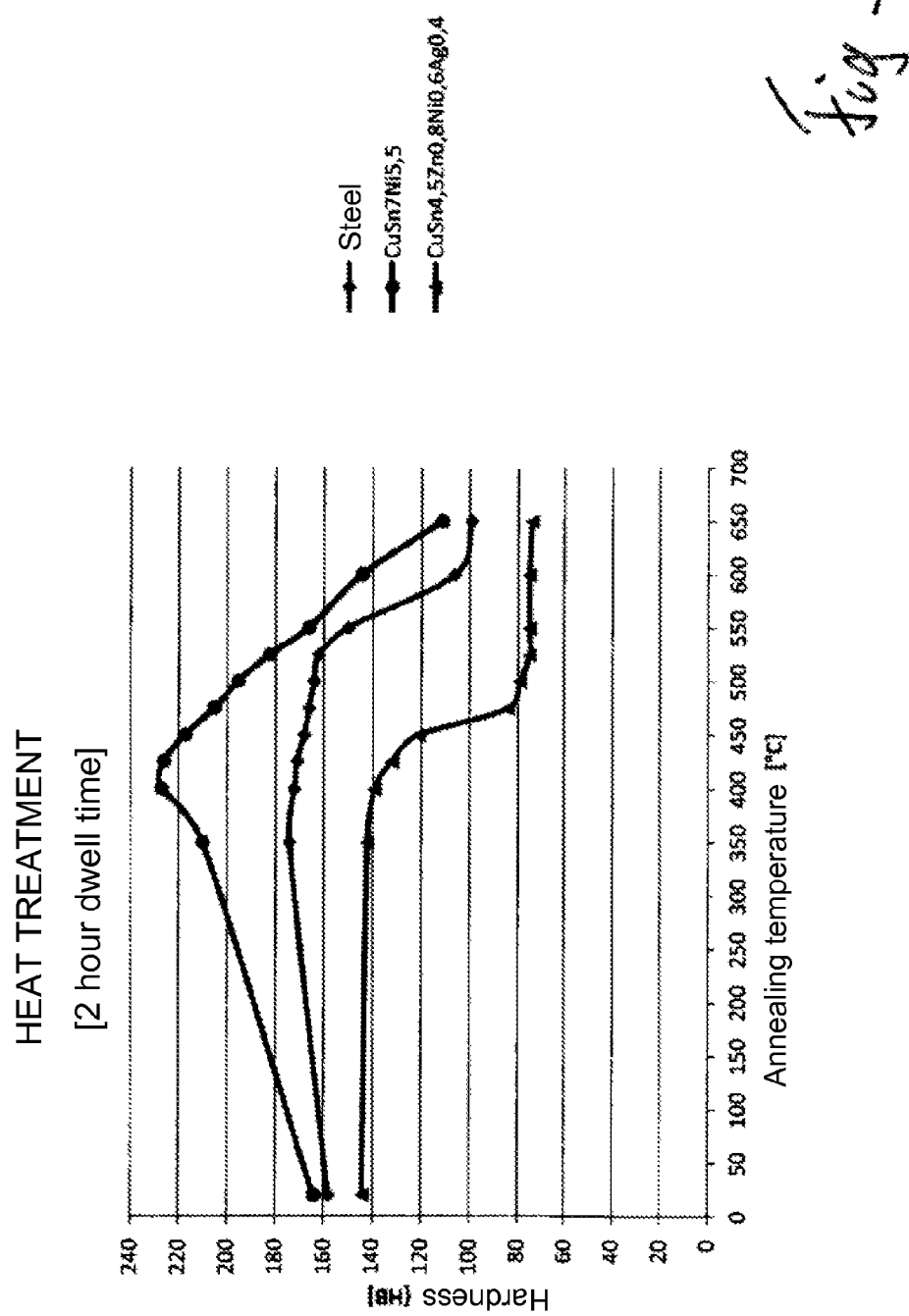

METALLIC COMPOSITE MATERIAL FOR A SLIDING BEARING COMPRISING A METALLIC SUPPORT LAYER

This application is the national stage of PCT/EP2014/051280, filed Jan. 23, 2014 and claims Paris convention priority from DE 10 2013 201 720.0, filed Feb. 1, 2013.

BACKGROUND OF THE INVENTION

The invention concerns a metallic composite material for a sliding bearing comprising a metallic support layer, in particular of steel, and a bearing metal layer on a copper-tin basis with 2-6 weight % of tin. Composite materials for a sliding bearing of this type are used for manufacturing sliding bearing elements, in particular, sliding bearing shells and sliding bearing bushings for applications in or close to the motor. Typical applications of the type referred to herein are main bearing shells and connecting rod bearing shells. Connecting rod bearing bushings for bearing a piston pin in combustion engines are, in contrast thereto, often designed in the form of monometal bushings.

There are conventional composite materials for a sliding bearing comprising a bearing metal layer of CuSn4, in particular CuSn4Pb and CuSn5Zn. There are also conventional alloys on the basis of copper-tin, wherein intermetallic SnNi phases are formed by adding nickel. Bearing metals, which are designed for percussive or impact loads that typically occur in piston pin bushings, can be produced by so-called spinodal hardening. In this connection, high tin contents and high nickel contents are typically used, in particular, in the form of the alloys CuSn9Ni15 or CuSn6Ni6.

DE 10 2006 019 826 B3 discloses composite materials for a sliding bearing of this type with wide limits for nickel and tin, namely 1.0 to 15 weight % and 2.0 to 12.0 weight % of tin. However, the embodiments disclose high in and nickel portions of 5.2 to 5.6 weight % of tin and 5.6 to 6.0 weight % of nickel in order to obtain spinodal hardening. By means of heat treatment at 300 to 500° C. one obtains hardnesses of the bearing metal layer of presumably more than 170 HBW 1/30/10.

AT 509 459 discloses a copper-based anti-fretting layer on a side of the composite material for a sliding bearing opposite to the bearing metal layer and facing a housing. The total portion of the alloy components germanium, tin, indium, zinc, nickel, cobalt, bismuth, lead, silver, antimony as well as impurities caused by production is 1-30 weight %. The anti-fretting layer may comprise, in particular, 5-25 weight % of tin and 0.2 to 8 weight % of nickel.

It is the underlying purpose of the present invention to further develop a metallic composite material for a sliding bearing of the above-described type in such a fashion that its tribological properties are improved towards adaptability and particle compatibility even at high sliding speeds. A high breaking elongation shall be realized.

SUMMARY OF THE INVENTION

In accordance with the invention, this object is achieved in a metallic composite material for a sliding bearing of this type in that the bearing metal layer comprises 0.2 to 2 weight % of nickel and the tin content is at least three times the nickel content.

The present invention refrains from using high tin and nickel contents with the aim of obtaining a high degree of hardness and therefore a high load capacity. The invention rather proposes to use low to moderate tin contents in connection with extremely low nickel contents. This considerably improves the adaptability and particle compatibility, which are of great importance exactly for use as a main bearing shell or a connecting rod bearing shell at high sliding speeds, in comparison with bearing alloys containing large amounts of nickel. Another surprising finding was that the addition of nickel in the claimed range of only 0.2 to 2 weight % still yielded an increase in breaking elongation by a factor of 2 to 3 compared with nickel-free copper-tin bronze. The tin content is advantageously at least four times higher than the nickel content.

In an advantageous further development of the invention, the bearing metal layer comprises 0.2 to 1.5 weight %, in particular 0.2 to 1.0 weight %, in particular 0.2 to 0.9 weight %, in particular 0.4 to 0.9 weight %, in particular 0.4 to 0.8 weight % of nickel.

With respect to the tin content, it is regarded to be advantageous for the bearing metal layer to comprise 2.0 to 5.5 weight %, in particular 3.0 to 5.5 weight %, in particular 3.5 to 5.5 weight %, in particular 3.5 to 5.0 weight % and moreover, in particular 4.0 to 5.0 weight % of tin.

It may also be advantageous for the bearing metal layer to additionally comprise 0.4 to 1.5 weight % of zinc and/or 0.2 to 1 weight % of silver. Adding silver improves the sintering properties, i.e. the sintering process runs more stably and reacts less to temperature fluctuations. The addition of zinc increases the corrosion resistance and the resistance to aggressive oils.

A preferred bearing metal layer is formed by a CuSn4.5Zn0.8Ni0.6Ag0.4 alloy.

It also turned out to be advantageous for the bearing metal layer to be a sinter layer that is formed from spherical to bulb-shaped particles.

Spherical to bulb-shaped particles as mentioned above defines those particles that have a predominantly rounded geometry without any sharp, pointed, peculiar or spattered shapes.

Sintering of the particles is advantageously accompanied by compaction such that the porosity of the generated bearing metal layer is at most 2%, advantageously at most 1%. It is determined by producing a ground cross-sectional surface, wherein the cross-section extends in a direction perpendicular to the broad extension of the composite material of a sliding bearing. This cross-sectional surface is then optically evaluated in order to determine the porosity.

For further production or structural design of the composite material for a sliding bearing, the invention proposes to perform reshaping through rolling after production of the layer composite and subsequent thereto to perform heat treatment between 450° and 520°. The composite material for a sliding bearing is solidified during reshaping by means of rolling. The reshaping is performed in a range between 5 to 25%, in particular in a region between 10 to 25% and between 15 to 25%, thereby increasing the hardness of the support layer to values of at least 140 HBW 1/30/10 as desired. The specification 1/30/10 means that the hardness was determined with a ball diameter of 1 mm, a load factor of 30 kg and during a load duration of 10 s in accordance with the conventional HBW hardness measurement method. The hardness is determined by applying a test load in a perpendicular direction onto the broad extension of the composite material for a sliding bearing at the bearing metal layer. This rolling treatment, however, also entails a hardness increase of the bearing metal layer on the basis of bronze which was discovered as being disadvantageous for the applications of the composite material for a sliding bearing intended in this connection. It turned out that with an inventive composition of the composite material for a sliding bearing, the hardness of the bearing metal layer could be considerably reduced by the above-mentioned heat treatment in a range between 450° and 520°. The hardness of the bearing metal layer is then advantageously between 70 HBW 1/10/10 and 100 HBW 1/10/10. If, on this basis, bearing elements are formed by a bending rolling process, the bearing metal layer solidifies again, which, however, then remains below critical limits.

Protection is furthermore claimed for a sliding bearing element produced from an inventive composite material for a sliding bearing, in particular, a main bearing shell or connecting rod bearing shell for mounting the crank shaft or for mounting an engine connecting rod, in particular, a motor vehicle engine connecting rod, to a crank pin of a crank shaft.

The sliding bearing element to be produced can be shaped in a bending rolling process on the basis of an inventive composite material for a sliding bearing.

It turns out to be advantageous for the hardness of the bearing metal layer of the sliding bearing element to be at most 160 HBW 1/10/10, in particular at most 150 HBW 1/10/10, in particular at most 140 HBW 1/10/10, in particular at most 130 HBW 1/10/10 and at least 100 HBW 1/10/10, in particular at least 110 HBW 1/10/10 after shaping of the composite material for a sliding bearing for forming the sidling bearing element.

It should also be pointed out that the inventive composite material for a sliding bearing and sliding bearing elements produced therefrom may comprise additional coatings on the side of the bearing metal layer facing the sliding partner, which are, however, removed for determining the hardnesses of the bearing metal layer. The coatings may e.g. be sputtered layers of a layer thickness of 2 to 20 µm, in particular 6-18 µm on the basis of aluminum, in particular on the basis of aluminum-tin or tin or tin-copper base alloys or bismuth or bismuth base alloys. Galvanic coatings of a layer thickness of 2-20 µm, in particular 6-18 µm in the form of tin or tin-copper base alloys or bismuth or bismuth base alloys may alternatively be provided. Feasible would also be a sliding lacquer of a layer thickness of 2-20 µm, in particular 4-15 µm on the basis of polymers, in particular PAI, with further tribologically effective fillers such as graphite, $MoS_2$, $TiO_2$, ZnS, hexagonal boron nitride. A diffusion inhibiting layer, typically on the basis of nickel, may be provided between the bearing metal layer and such a surface coating.

Further features, details and advantages of the invention can be extracted from the enclosed claims and the drawing and the following description of a preferred embodiment of the invention.

BRIEF DESCRIPTION OF THE DRAWING

FIG. 3 shows the result of hardness measurements after heat treatment.

DESCRIPTION OF THE PREFERRED EMBODIMENT

Figure 1:
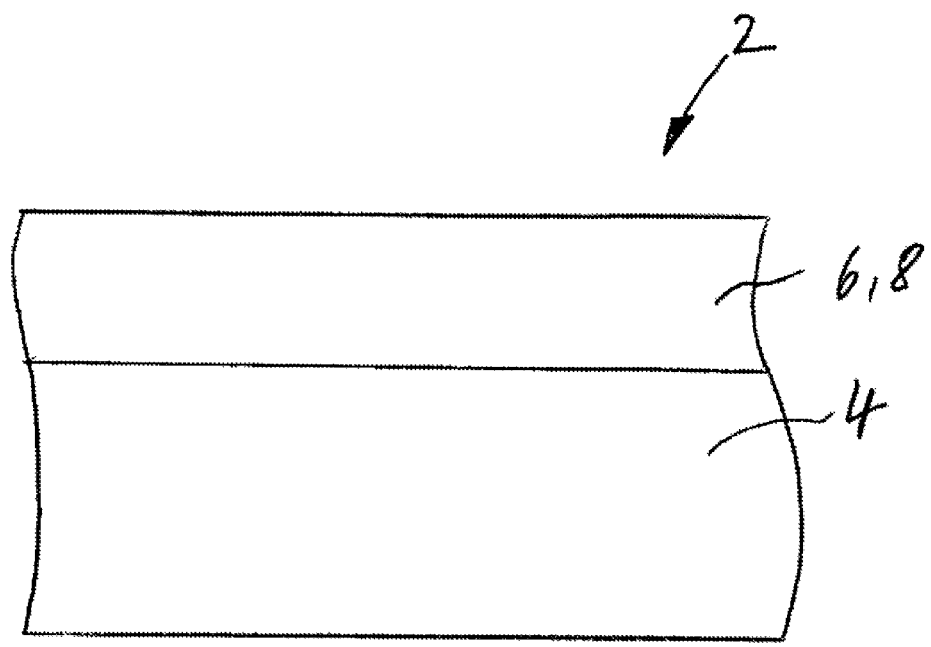
FIG. 1 shows a schematic sectional view of an inventive composite material for a sliding bearing.

FIG. 1 shows a schematic sectional view of a composite material for a sliding bearing designated altogether by reference numeral 2.

The composite material 2 for a sliding bearing comprises a metallic support layer 4, typically of steel, and a bearing metal layer 6 on the basis of copper-tin, i.e. of bronze. The bearing metal layer 6 is preferably a sinter layer 8. It is formed of a bearing alloy comprising 2 to 6 weight % of tin and 0.2 to 2 weight % of nickel. Preferred alloy compositions can be gathered from the statements made at the beginning. A preferred alloy is CuSn4.5Zn0.8Ni0.6Ag0.4.

The sinter layer 8 is formed of spherical to bulb-shaped alloy particles which are "densely sintered" with each other such that the sinter layer has a porosity of advantageously only maximally 1%. For this reason, it fundamentally differs from a three-dimensional porous support layer for receiving and holding an additional sliding bearing material on the basis of polymers. The sinter layer 8 rather forms a purely metallic bearing metal layer 6.

Figure 2:
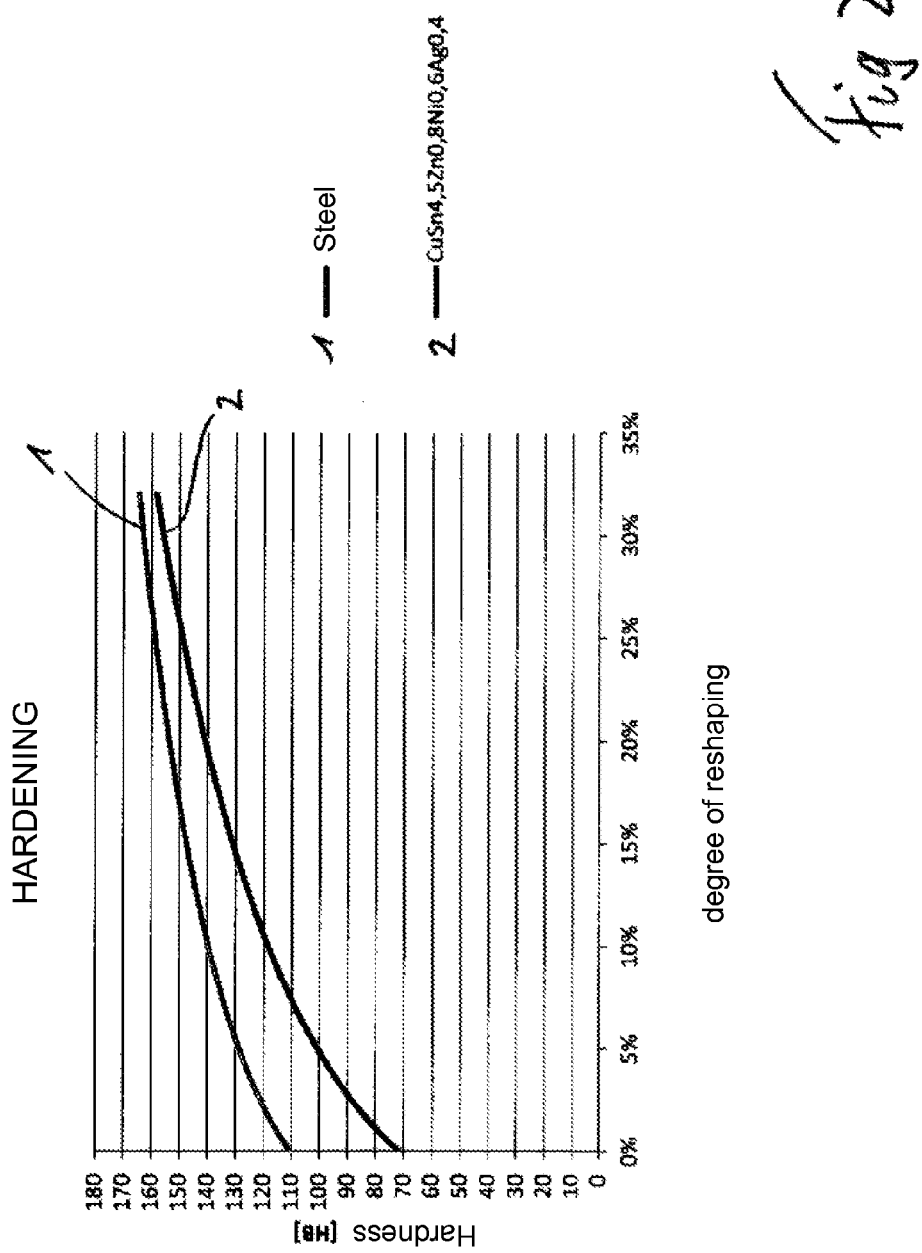
FIG. 2 shows the result of hardness measurements after reshaping.

FIG. 2 shows the hardening of a support layer of steel and an inventive bearing metal layer during reshaping through rolling after production of the layer composite.

FIG. 3 shows the influence of heat treatment on the hardness of a steel layer and on a previously known bearing metal layer of the composition CuSn7Ni5.5 and an inventive composition CuSn4.5Zn0.8Ni0.6Ag0.4. It shows that heat treatment of bearing metal layers of this type with a high in and nickel content up to temperatures of more than 425° results in a further hardness increase which can be reduced only at very high temperatures at which the steel hardness also decreases which is not desired. The hardness increase of the bearing metal layer in accordance with the inventive composition, which is also due to reshaping but is far below the hardness of high-alloyed bearing metal layers, can be reduced through heat treatment at relatively moderate temperatures. This is advantageous in that at these moderate temperatures, the desired high hardness of the support layer can almost be maintained.

It is possible to increase the breaking elongation of a test sample of this alloy CuSn4.5Zn0.8Ni0.6Ag0.4 by a factor of 2 to 3 compared with CuSn4.5Ag0.4 or CuSn4.5Zn0.8Ag0.4 (measured after heat treatment at 500° C. and without support layer) already with a very low nickel content of only 0.6 weight % which is likewise a measure for a high embedding capacity of foreign particles and reduced notching effects.

The inventive composite material for a sliding bearing and sliding bearing elements produced therefrom are therefore characterized by a high degree of adaptability and particle compatibility. They are suited for use in connection with high sliding speeds that occur e.g. in crank shaft bearing shells or connecting rod bearing shells.

We claim:
1. A metallic composite material for a sliding bearing, the composite material comprising:
   a metallic support layer; and
   a bearing metal layer on a copper-tin basis with 2-6 weight % of tin and 0.2 to 2 weight % of nickel, wherein said bearing metal layer has a tin content which is at least three times a nickel content thereof, wherein said bearing metal layer additionally comprises 0.4 to 1.5 weight % of zinc and 0.2 to 1 weight % of silver.
2. The composite material for a sliding bearing of claim 1, wherein said tin content is at least four times said nickel content.
3. The composite material for a sliding bearing of claim 1, wherein said bearing metal layer comprises 0.2 to 1.5 weight % of nickel.

4. The composite material for a sliding bearing of claim 1, wherein said bearing metal layer comprises 2.0 to 5.5 weight % of tin.

5. The composite material for a sliding bearing of claim 1, wherein said bearing metal layer is formed by a CuSn4.5Zn0.8Ni0.6Ag0.4 alloy.

6. The composite material for a sliding bearing of claim 1, wherein said bearing metal layer is a sinter layer that is formed from rounded particles.

7. The composite material for a sliding bearing of claim 6, wherein a porosity of said bearing metal layer is at most 2%.

8. The composite material for a sliding bearing of claim 1, wherein a production of the composite material is followed by reshaping through rolling and, subsequent thereto, by heat treatment between 450° C. and 520° C.

9. A sliding bearing element for applications in a motor, for a main bearing shell or for a connecting rod bearing shell, wherein the sliding bearing element is produced from the composite material for a sliding bearing of claim 1.

10. A metallic composite material for a sliding bearing, the composite material consisting of:
   a metallic support layer; and
   a bearing metal layer on a copper-tin basis with 2-6 weight % of tin and 0.2 to 2 weight % of nickel, wherein said bearing metal layer has a tin content which is at least three times a nickel content thereof, wherein said bearing metal layer additionally comprises 0.4 to 1.5 weight % of zinc and 0.2 to 1 weight % of silver.

11. The composite material for a sliding bearing of a claim 10, wherein a production of the composite material is followed by reshaping through rolling and, subsequent thereto, by heat treatment between 450° C. and 520° C.

12. The composite material for a sliding bearing of claim 11, wherein a hardness of said bearing metal layer after heat treatment is between 70 HBW 1/10/10 and 100 HBW 1/10/10.

13. A sliding bearing element for applications in a motor, for a main bearing shell or for a connecting rod bearing shell, wherein the sliding bearing element is produced from the composite material for a sliding bearing of claim 10.

14. The sliding bearing element of claim 13, wherein, after shaping of the composite material for a sliding bearing for forming the sliding bearing element, a hardness of said bearing metal layer is at most 160 HBW 1/10/10 and at least 100 HBW 1/10/10.

15. The sliding bearing element of claim 9, wherein an additional coating is provided on a side of said bearing metal layer facing a sliding partner in a form of a sputtered layer on a basis of aluminum, on a basis of aluminum-tin, on a basis of tin or tin-copper, of bismuth or on a basis of bismuth or in a form of a galvanic coating on a basis of tin or tin-copper, of bismuth or on a basis of bismuth or in a form of a sliding lacquer on a basis of polymers of PAI or with further tribologically effective fillers such as graphite, $MoS_2$, $TiO_2$, ZnS or hexagonal boron nitride.

* * * * *